Jan. 10, 1939.　　　A. A. THOMAS　　　2,143,528
PNEUMATIC TIRE
Filed June 18, 1937
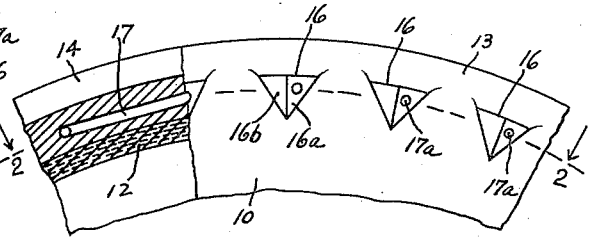
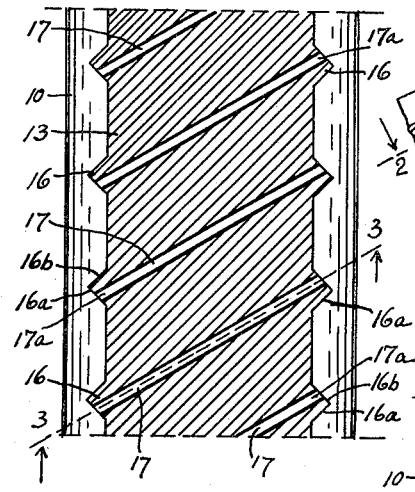
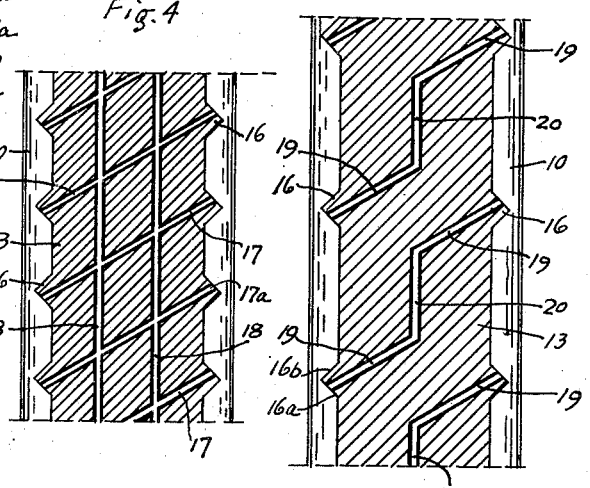
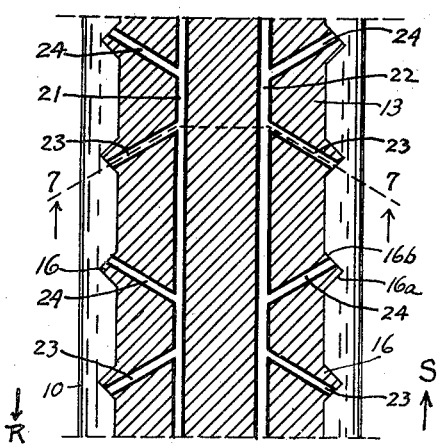
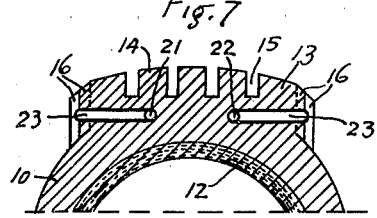
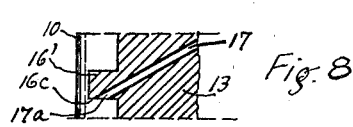
INVENTOR:
Adolph A. Thomas Patented Jan. 10, 1939

2,143,528

UNITED STATES PATENT OFFICE 2,143,528

PNEUMATIC TIRE

Adolph A. Thomas, New York, N. Y., assignor to United States Rubber Company, New York, N. Y., a corporation of New Jersey Application June 18, 1937, Serial No. 148,823

16 Claims. (Cl. 152—153)

My invention relates to pneumatic tires for vehicles and its object is to provide a tire casing with an air cooled tread so constructed that during travel there is a forced circulation of cooling air through the hot portions of the tread, whereby overheating of the air in the inner tube is prevented.

In carrying out the purposes of my invention, I provide the tire tread with air ducts arranged obliquely to the tire axis so that the inlet ends of the ducts are at an angle to the plane of the tire. As a result, the inlets or mouths of the oblique air ducts are directly open to the air in the direction of travel, and a copius supply of fresh air is thus continuously forced through the ducts at high velocity for rapidly carrying off the heat in the tread. The oblique arrangement of the air ducts increases their length and therefore their cooling capacity. In some cases, especially in extra large tires, I may add one or more circumferential air ducts in communication with the transverse ducts to increase and accelerate the cooling effect. By thus keeping the tire tread relatively cool, overheating of the air in the inner tube is practically frustrated, so that the danger of heat blowouts is averted or reduced to a minimum.

The novel features and practical advantages of my new tire casing will be understood from a description of the accompanying drawing, in which Fig. 1 is a side view (partly sectioned) of a tire casing equipped with my invention, only a portion of the casing being shown for lack of space;

Fig. 2 represents a plan in section on line 2—2 of Fig. 1;

Fig. 3 is a transverse section on line 3—3 of Fig. 2;

Figs. 4, 5 and 6 show modifications in sectional plan views;

Fig. 7 is a transverse section on line 7—7 of Fig. 6; and

Fig. 8 is a fragmentary sectional plan view of another modification.

Referring to Figs. 1-3, which show what is perhaps the simplest form of my invention, the pneumatic tire casing 10 comprises the usual foundation 12 of cord fabric or the like and a heavy rubber tread 13 which has the customary traction ribs 14 separated by grooves 15. So far the casing 10 is of standard structure. The rubber tread 13 has integral projections 16 on each side, circumferentially spaced, and in the present instance these projections are triangular so as to have slanting faces 16a and 16b. The tread 13 is pierced transversely by a series of parallel air ducts 17 arranged obliquely to the axis and plane of the tire, these air ducts extending through the projections 16 and terminating in the slanting faces 16a—16b of projections 16. The air ducts 17 pass clear through the tread 13 from side to side and extend axially in straight lines, so that they can be formed by straight mold pins.

It is clear from Fig. 2 that, whichever way we imagine the tire to be travelling, the open ends or mouths 17a of the oblique air ducts 17 are directly exposed to the air in the direction of travel. Consequently, a continuous draft of air is forced through the transverse ducts 17, which, by slanting in the direction of movement, assist in collecting the air and cause it to flow through the ducts at high velocity, whereby the heat in the tread is carried off rapidly. This prevents dangerous overheating of the air in the inner tube, especially at high speeds, so that heat blowouts are practically eliminated. The cooling ducts 17 are self-cleaning because the stream of air forced therethrough carries away any solid matter that may enter, such as dirt or sand. The oblique or slanting arrangement of the air holes 17 has the further advantage of increasing their length and thereby their cooling efficiency. It is obvious that the particular angle of slant may vary, the 15-degree angle shown in Fig. 1 being merely for illustration. Also, the most effective diameter of air ducts 17 and their distance from the outer surface of the tread 13 will depend upon the size and design of the tread, particularly its depth, these details being a matter of experiment within the skill of the tire maker.

All that has been said for Fig 2 applies to Fig. 4, where the oblique transverse air ducts 17 are intersected by two circumferential air ducts 18, which increase the cooling effect. The air entering the transverse ducts 17 divides between the interconnected passages, part of the air stream flowing across the tread and part around it through ducts 18. This network of transverse and circumferential air ducts is particularly advantageous in large tires with extra thick treads, like those used on buses and other heavy vehicles.

In the modification of Fig. 5 each transverse air passage consists of two end portions 19 connected by a circumferential portion 20. This Z-shaped configuration of air ducts 19—20 considerably increases their length and consequently their cooling capacity. The middle sections 20 of air passages 19—20 are arranged in a circle and constitute a series of spaced circumferential air ducts. Otherwise, what was said for the construction in Fig. 2 is also intended for Fig. 5 without the need of repetition.

In Fig. 6, the tread 13 has a pair of spaced circumferential air passages 21—22, and two sets of transverse air ducts 23—24 on both sides of the tire communicating with the circumferential passages. It will be observed that the transverse ducts 23—24 slant in opposite directions. If the tire is so mounted that its forward movement is in the direction of arrow R, the air ducts 23 on both sides of the tread diverge forwardly and scoop up the air with their open mouths, whereby a continuous stream of air is forced through the transverse ducts and through the circular passages 21—22. If the forward movement of the tire is in the direction of arrow S, the mouths of the slanting ducts 24 are directly open to the air, with the same result as stated in the preceding sentence. So it makes no difference which way the tire is mounted on the wheel to obtain the full cooling effects initiated by the slanting air ducts, and this applies to the other illustrations as well. In the specific construction of Fig. 6, whichever set of air ducts 23—24 slants forward in the direction of travel, the other air ducts (now slanting toward the rear) will draw in air by suction, so that all the transverse air ducts 23—24 and the circumferential passages 21—22 are always operative for maximum cooling efficiency. The construction shown in Fig. 6, like that in Fig. 4, is intended especially for the large tires of heavy vehicles.

As for Fig. 8, I need only mention that the projections 16' differ from the projections 16 in being rectangular to provide a face 16c substantially at right angles to the plane of the tire. The inlet end or mouth 17a of each air duct 17 terminates in the face 16c of the adjacent projection, whereby the inlet area of the air duct and therefore its air-collecting capacity are greatly increased, as will be clear without further explanation. It will be understood that the square projections 16' may replace the triangular projections 16 in all the various modifications.

It will be seen from the foregoing description of my invention that I have produced a tire casing which effectively prevents heat blowouts by keeping the tread relatively cool, so that the air in the inner tube can not become heated to the blowout point. This removes one of the greatest dangers in motor travel, for heat blowouts usually occur at high speeds and frequently cause fatal accidents. The cooling air ducts in my new tire permit the use of the standard form and construction of casing, and they are so arranged that they do not weaken the tread, while adding to the elasticity of the tire as a whole. The oblique position of the air ducts automatically produces a forced circulation of air therethrough to cary off the heat of the tread rapidly, even at high speeds of the tire when the tread gets hottest. For this reason the use of my air cooled tire on racing cars adds a factor of safety to the sport of motor racing.

Although I have shown and described certain specific constructions, I would have it understood that my invention is not limited to the details set forth. It is to be expected that in the commercial embodiments of my invention various changes and modifications will be made to meet certain requirements without departing from the scope of the invention as defined in the appended claims.

I may add that the drawing has not been made with the mathematical accuracy of shop drawings. In fact, I have purposely exaggerated the relative dimensions of some parts for clearness.

I claim as my invention:

1. A pneumatic tire having a tread provided with air ducts extending obliquely in straight lines clear through the tread from side to side, the ends of said air ducts terminating in planes which cut obliquely across the tire.

2. A pneumatic tire having a tread provided with transverse air ducts arranged obliquely to the axis of the tire and extending in straight lines, and side projections on the tread for causing the ends of each air duct to terminate in substantially parallel planes which cut obliquely across the tire.

3. A pneumatic tire having a tread provided with transverse air ducts arranged obliquely to the axis of the tire, the inlet end of each duct terminating in a plane which intersects the tread at an angle to the plane of the tire, said plane being substantially vertical for each air duct when the latter reaches its highest point during rotation of the tire.

4. A pneumatic tire having a tread provided with lateral projections circumferentially spaced, said projections having front and rear faces, and transverse air ducts in the tread arranged obliquely to the tire axis and extending through said said projections, said oblique air ducts terminating on one side of the tire in the front faces of said projections to provide air inlets and terminating on the other side of the tire in the rear faces of said projections to provide air outlets, regardless of the direction in which the tire rotates.

5. A pneumatic tire having a tread provided on each side with a plurality of spaced projections, and transverse air ducts in the tread extending obliquely from the projections on one side to those on the other side, each air duct extending axially in a straight line, said projections having faces in which the open ends of said air ducts terminate. the terminal planes of said ends being at an angle to the plane of the tire and substantially vertical when each air duct reaches its highest point of travel.

6. A pneumatic tire having a tread provided with lateral projections circumferentially spaced, said projections having front and rear faces, and transverse air ducts in the tread arranged obliquely to the tire axis and extending through said projections, which are so shaped that the inlet ends of said air ducts are at an angle to the plane of the tire so as to be open to the air in the direction of travel, said oblique air ducts terminating on one side of the tire in the front faces of said projections to provide air inlets and terminating on the other side of the tire in the rear faces of said projections to provide air outlets, regardless of the direction in which the tire rotates.

7. A pneumatic tire having a tread provided with transverse air ducts arranged obliquely to the axis of the tire, and lateral projections on the tread circumferentially spaced, said projections having front and rear oblique faces in which said air ducts terminate, said oblique air ducts terminating on one side of the tire in the front faces of said projections to provide air inlets and terminating on the other side of the tire in the rear faces of said projections to provide air outlets, whereby the oblique inlet ends of the air ducts are open to the air in the direction of travel, no matter which way the tire is mounted on the wheel.

8. A pneumatic tire having a tread provided on each side with triangular projections which have front and rear slanting faces, and transverse air ducts in the tread extending obliquely to the axis of the tire, the ends of each air duct being located respectively in the front and rear faces of a pair of radially spaced projections, whereby the ends of said air ducts on one side of the tire act as air inlets and those on the other side act as outlets irrespective of the direction in which the tire turns.

9. A pneumatic tire having a tread provided with lateral projections, each projection having front and rear faces substantially at right angles to the plane of the tire, and transverse air ducts in the tread arranged obliquely to the axis of the tire and extending through said projections, the inlet end of each air duct being located in the front face of a projection and the outlet end in the rear face of an opposite projection.

10. A pneumatic tire having a molded rubber tread formed with a circumferential air duct and with a plurality of transverse air ducts which communicate with said circumferential duct, the latter being formed independently of the transverse ducts which meet the circumferential duct at points separated from each other, said circumferential air duct and transverse air ducts lying in the same cylindrical plane.

11. A pneumatic tire having a molded rubber tread formed with a circumferential air duct and with a plurality of transverse air ducts which communicate with said circumferential duct, the latter being formed independently of the transverse ducts which meet the circumferential duct at points separated from each other and are oblique to the axis of the tire, said circumferential air duct and transverse air ducts lying in the same cylindrical plane.

12. A pneumatic tire having a molded rubber tread formed with a plurality of air ducts, each air duct consisting of two transverse end portions connected by a circumferential portion.

13. A pneumatic tire having a molded rubber tread formed with two circumferential air ducts and with a plurality of transverse air ducts arranged obliquely to the axis of the tire, the air ducts on one side communicating with one of said circumferential ducts and the other transverse air ducts communicating with the other circumferential duct.

14. A pneumatic tire having a tread provided with air ducts which extend in straight lines clear through the tread from side to side, the ends of said air ducts terminating in planes which cut obliquely across the tire.

15. A pneumatic tire having a tread provided with lateral projections circumferentially spaced, said projections having front and rear faces, and transverse air ducts in the tread extending through said projections, which are so shaped angle to the plane of the tire so as to be open to the air in the direction of travel, said air ducts terminating on one side of the tire in the front faces of said projections to provide air inlets and terminating on the other side of the tire in the rear faces of said projections to provide air outlets, regardless of the direction in which the tire rotates.

16. A pneumatic tire having a tread provided with lateral projections circumferentially spaced, said projections being arranged to present front and rear faces angularly disposed relative to the plane of the tire, and air ducts disposed in said tread arranged at least in part obliquely to the tire axis, each of said ducts communicating between at least a pair of said circumferentially spaced projections and terminating in a front face on one projection and in a rear face on another projection to provide an air inlet and an air outlet, respectively, regardless of the direction in which the tire rotates.

ADOLPH A. THOMAS.